United States Patent
Woolmer et al.

(10) Patent No.: US 9,287,755 B2
(45) Date of Patent: Mar. 15, 2016

(54) ELECTRIC MACHINE—OVER-MOULDING CONSTRUCTION

(75) Inventors: Tim Woolmer, Oxford (GB); Chris Gardner, Reading (GB); Jon Barker, Oxford (GB)

(73) Assignee: YASA MOTORS LIMITED, Oxfordshire (GB)

(*) Notice: Subject to any disclaimer, the term of this patent is extended or adjusted under 35 U.S.C. 154(b) by 523 days.

(21) Appl. No.: 13/817,516

(22) PCT Filed: Aug. 16, 2011

(86) PCT No.: PCT/GB2011/051550
§ 371 (c)(1),
(2), (4) Date: Feb. 18, 2013

(87) PCT Pub. No.: WO2012/022974
PCT Pub. Date: Feb. 23, 2012

(65) Prior Publication Data
US 2013/0147291 A1     Jun. 13, 2013

(30) Foreign Application Priority Data

Aug. 19, 2010 (GB) .................................. 1013881.6
Mar. 2, 2011 (GB) .................................. 1103504.5

(51) Int. Cl.
*H02K 9/28* (2006.01)
*H02K 15/02* (2006.01)
(Continued)

(52) U.S. Cl.
CPC .. *H02K 9/28* (2013.01); *H02K 1/14* (2013.01); *H02K 3/521* (2013.01); *H02K 5/20* (2013.01);
(Continued)

(58) Field of Classification Search
CPC ......... H02K 15/02; H02K 1/14; H02K 21/24; H02K 3/521; H02K 5/20; H02K 5/225; H02K 9/19; H02K 9/28; H02K 15/12; H02K 3/46; Y10T 29/49009

USPC ............................. 310/58, 43, 89, 194, 254.1
See application file for complete search history.

(56) References Cited

U.S. PATENT DOCUMENTS 3,413,503 A * 11/1968 Parker .................... H02K 1/182
                                                  310/268
4,082,971 A *  4/1978 Miyake .................. H02K 23/54
                                                  310/114
(Continued)

FOREIGN PATENT DOCUMENTS

FR     2823382     10/2002
GB     2379093     2/2003
(Continued)

OTHER PUBLICATIONS

International Preliminary Report on Patentability, mailed Feb. 28, 2013, in International Patent Application No. PCT/GB2011/051550.
(Continued)

*Primary Examiner* — Alex W Mok
(74) *Attorney, Agent, or Firm* — Meunier Carlin & Curfman LLC

(57) ABSTRACT

An electric machine (10) comprises a rotor (14a, b) having permanent magnets (24a, b) and a stator (12) having coils (22) wound on stator bars (16) for interaction with the magnets across an air gap (26a, b) defined between them. The bars (16) and coils (22) are enclosed by an annular stator housing (42a, b) that extends between the air gap. A chamber (52, 54, 56) is defined that incorporates cooling medium to cool the coils. The stator housing comprises two mating clamshells (42a, b) that mount the stator bars and coils in the machine. Each clamshell is molded from reinforced plastics and interconnected (optionally through one or more intermediate components). At least one clamshell has over-molded therein stator bar shoes that form part of said radial wall, and optionally one or more of the following components: cylindrical boss supports extending along the cylindrical outer wall part; connection studs that communicate electrically the chamber externally; stator coils; coolant inlet and outlet ports; and an outer race of a rotor bearing.

35 Claims, 11 Drawing Sheets

(51) Int. Cl.
*H02K 1/14* (2006.01)
*H02K 3/52* (2006.01)
*H02K 5/20* (2006.01)
*H02K 21/24* (2006.01)
*H02K 5/22* (2006.01)
*H02K 9/19* (2006.01)

(52) U.S. Cl.
CPC ............ *H02K 15/02* (2013.01); *H02K 21/24* (2013.01); *H02K 5/225* (2013.01); *H02K 9/19* (2013.01); *Y10T 29/49009* (2015.01)

(56) References Cited

U.S. PATENT DOCUMENTS

| | | | |
|---|---|---|---|
| 4,435,662 A * | 3/1984 | Tawse | H02K 21/24 310/168 |
| 4,464,592 A | 8/1984 | Major | |
| 5,334,899 A * | 8/1994 | Skybyk | H02K 1/2793 310/114 |
| 5,345,777 A * | 9/1994 | Sekino | B60H 1/00007 180/65.51 |
| 5,578,879 A | 11/1996 | Heidelberg et al. | |
| 5,910,697 A * | 6/1999 | Sromin | H02K 1/182 310/179 |
| 5,982,070 A * | 11/1999 | Caamano | H02K 1/02 29/596 |
| 6,304,011 B1 | 10/2001 | Pullen et al. | |
| 6,488,486 B1 * | 12/2002 | Debleser | F04D 25/082 310/52 |
| 6,515,384 B1 | 2/2003 | Kikuchi et al. | |
| 6,720,688 B1 * | 4/2004 | Schiller | H02K 1/2793 310/266 |
| 6,849,982 B2 * | 2/2005 | Haydock | H02K 3/46 310/156.32 |
| 6,903,471 B2 | 6/2005 | Arimitsu | |
| 6,922,004 B2 * | 7/2005 | Hashimoto | H02K 7/116 180/65.51 |
| 7,002,277 B2 * | 2/2006 | Yamamoto | H02K 15/02 29/596 |
| 2002/0067091 A1 | 6/2002 | Kliman et al. | |
| 2003/0048034 A1 | 3/2003 | Furuse et al. | |
| 2004/0145252 A1 * | 7/2004 | Arimitsu | B60K 6/445 310/58 |
| 2004/0164641 A1 * | 8/2004 | Yamada | H02K 1/148 310/216.105 |
| 2004/0174087 A1 * | 9/2004 | Heidrich | H02K 1/148 310/216.064 |
| 2005/0035676 A1 * | 2/2005 | Rahman | B60K 6/26 310/83 |
| 2005/0140244 A1 * | 6/2005 | Yamada | H02K 29/03 310/268 |
| 2005/0261083 A1 | 11/2005 | Liao | |
| 2006/0103263 A1 * | 5/2006 | Naito | H02K 1/148 310/268 |
| 2006/0113856 A1 * | 6/2006 | Tanno | H02K 1/2793 310/156.37 |
| 2006/0279150 A1 * | 12/2006 | Kojima | H02K 3/524 310/91 |
| 2007/0018520 A1 * | 1/2007 | Kaneko | H02K 29/03 310/156.35 |
| 2007/0046124 A1 * | 3/2007 | Aydin | H02K 21/24 310/156.37 |
| 2007/0138876 A1 * | 6/2007 | Evans | H02K 1/148 310/10 |
| 2007/0262674 A1 | 11/2007 | Shibukawa et al. | |
| 2009/0025830 A1 * | 1/2009 | Uozumi | B22F 1/0055 148/312 |
| 2009/0218540 A1 * | 9/2009 | Takami | C01G 49/0018 252/62.57 |
| 2009/0309430 A1 * | 12/2009 | Jee | H02K 3/24 310/52 |
| 2011/0156519 A1 * | 6/2011 | Wang | H02K 21/24 310/114 |

FOREIGN PATENT DOCUMENTS

| | | |
|---|---|---|
| JP | H0591696 | 4/1999 |
| JP | 2006014436 | 1/2006 |
| JP | 2006033965 | 2/2006 |
| JP | 2007020321 | 1/2007 |
| JP | 2008312319 | 12/2008 |
| WO | 2008/032430 | 3/2008 |

OTHER PUBLICATIONS

Official Notice of Rejection from the Japanese Patent Office dated Jun. 2, 2015, in corresponding JP Application No. 2013-524481.
U.S. Appl. No. 13/148,871, filed Aug. 10, 2011.
Non Final Office Action dated Dec. 6, 2013, received in U.S. Appl. No. 13/148,871.
Final Office Action dated Jun. 2, 2014, received in U.S. Appl. No. 13/148,871.
Non Final Office Action dated Jan. 2, 2015, received in U.S. Appl. No. 13/148,871.
Final Office Action dated Aug. 12, 2015, received in U.S. Appl. No. 13/148,871.
Official Notice of Rejection dated Feb. 25, 2014, in JP application No. 2011-549676.
Official Notice of Final Decision of Rejection dated Oct. 28, 2014, in JP application No. 2011-549676.

* cited by examiner

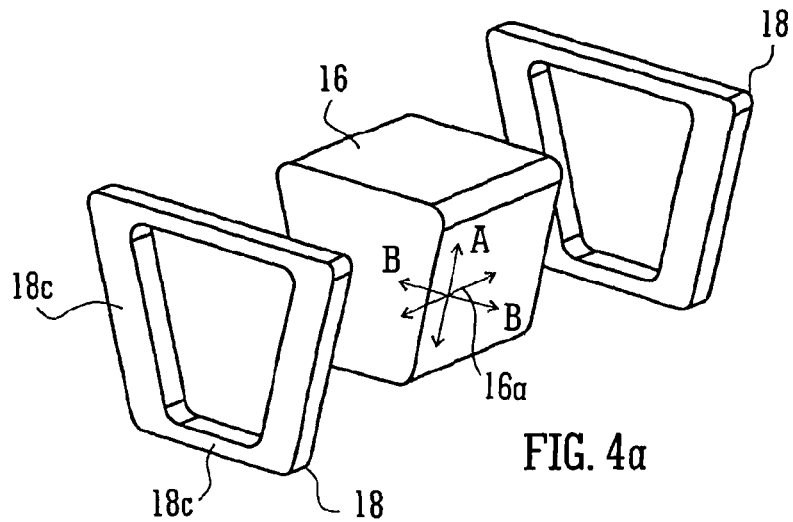
FIG. 4a
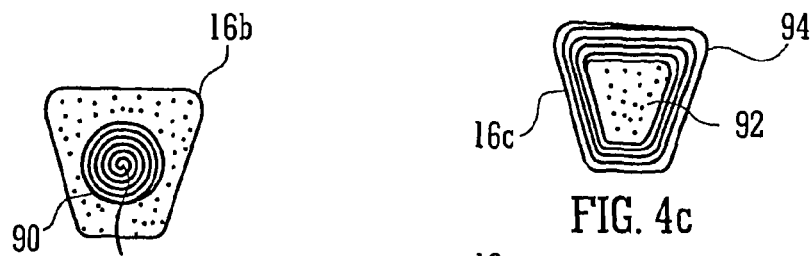
FIG. 4b
FIG. 4c
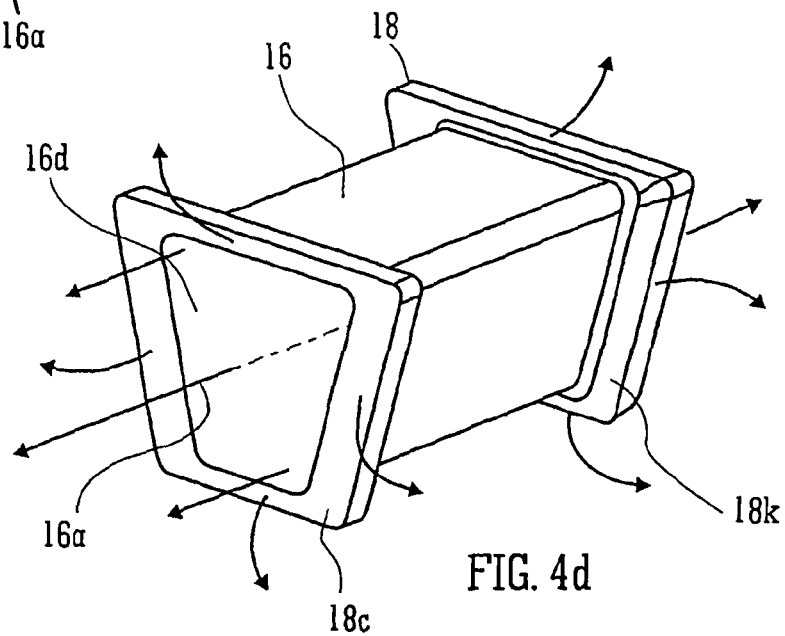
FIG. 4d

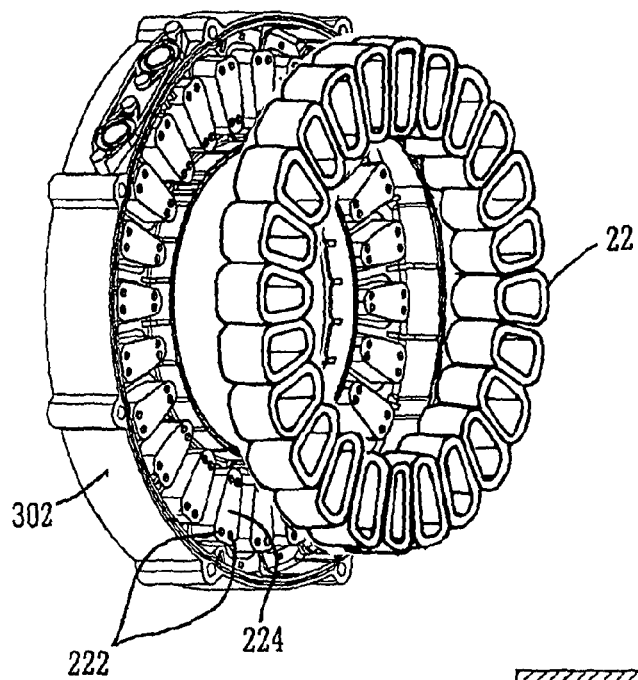
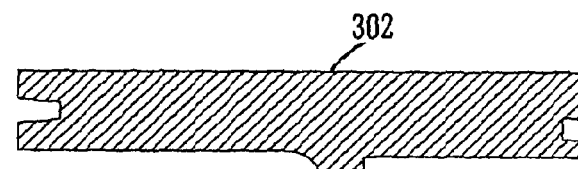
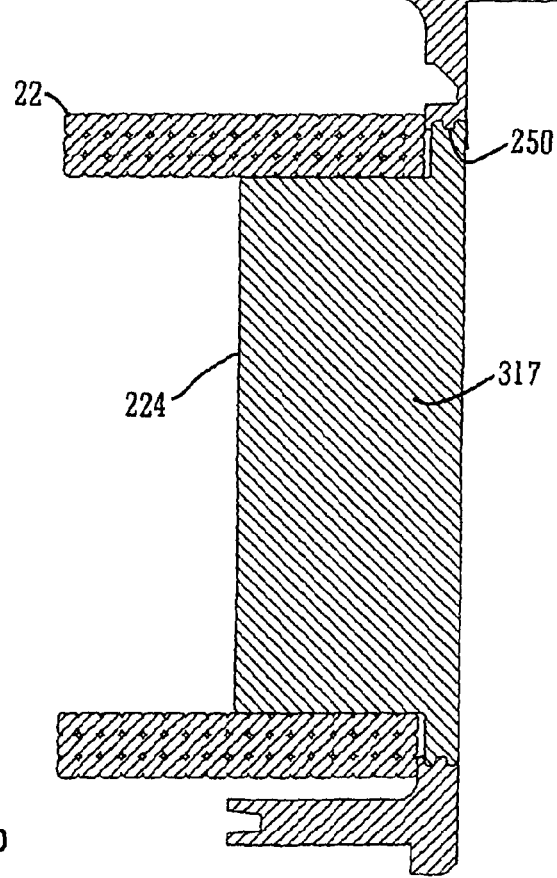
FIG. 8a
FIG. 8b

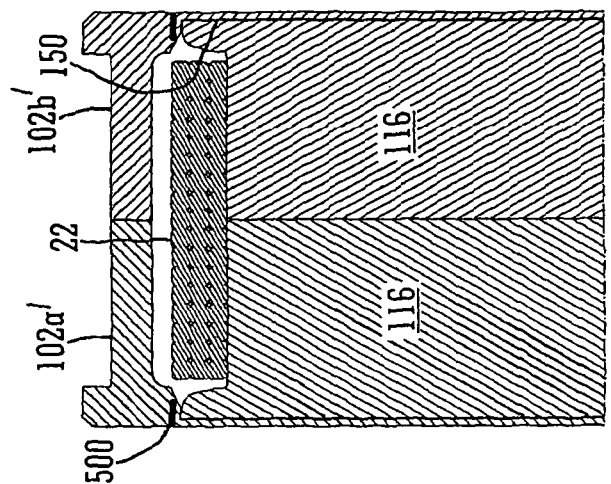
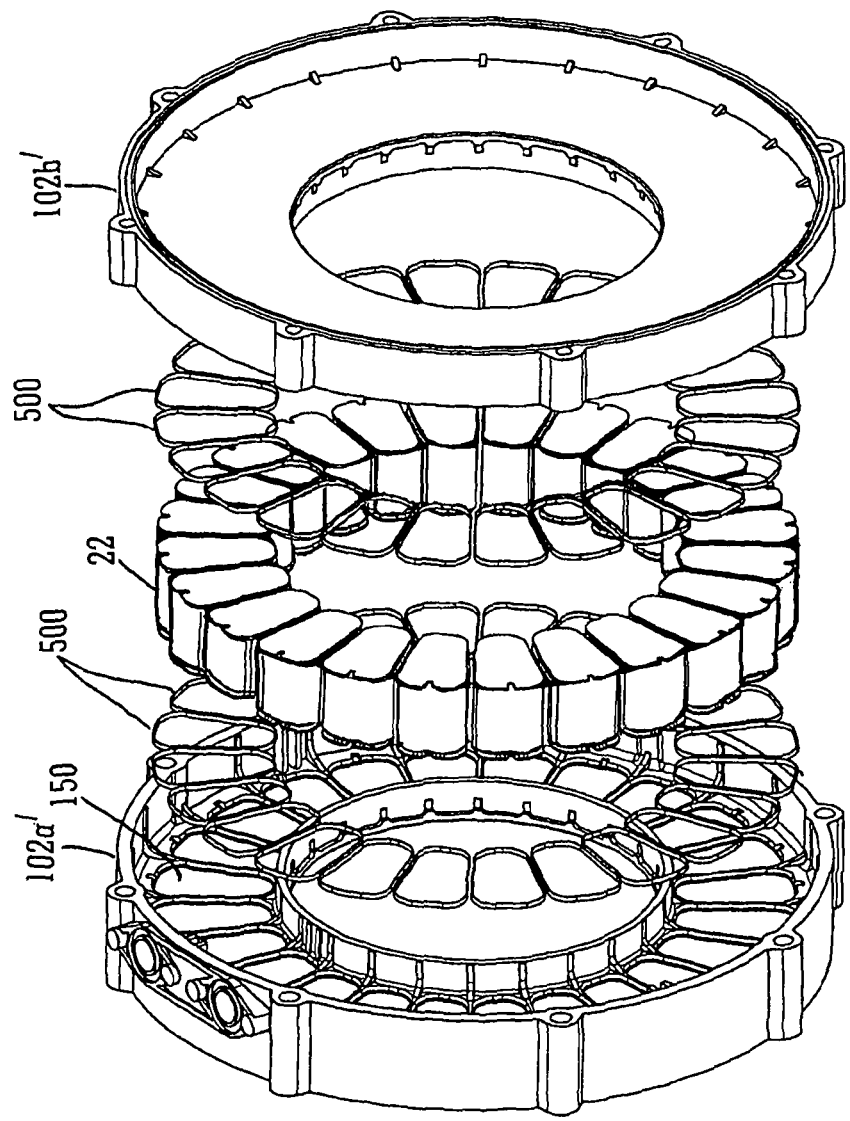
FIG. 10b
FIG. 10a

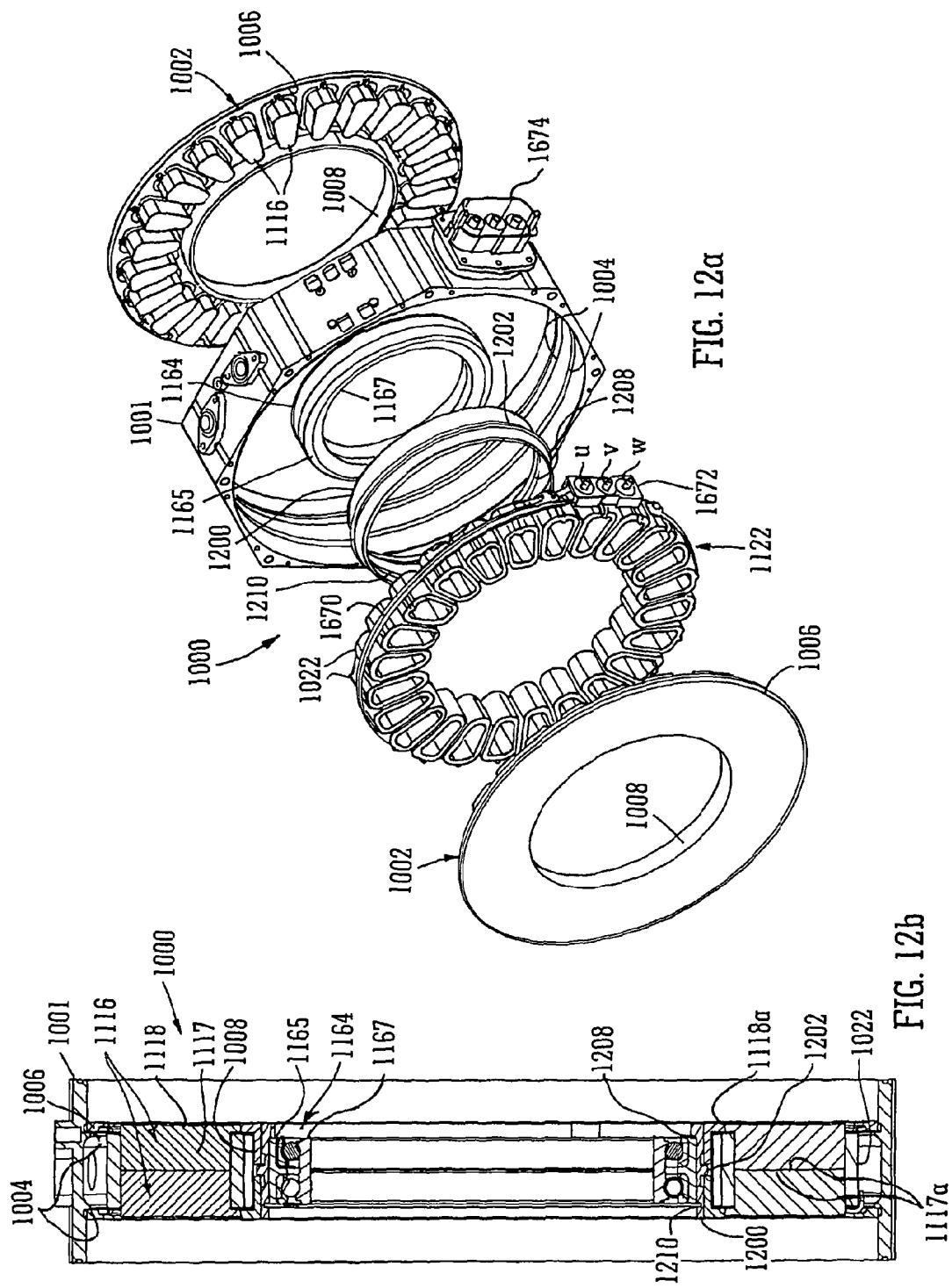

ELECTRIC MACHINE—OVER-MOULDING CONSTRUCTION

This invention relates to a permanent magnet electric machine comprising a stator and a rotor journalled for rotation in the stator, and a method of constructing such a machine. The stator is provided with coils wound on stator bars and the rotor is provided with permanent magnets to cooperate with the coils across an air gap between the rotor and stator. The machine may be either a motor or a generator and is in many embodiments an axial flux machine. In particular, the present invention relates to a yokeless and segmented armature machine, hereinafter termed a "Y machine", and a method of constructing such a machine.

BACKGROUND

Woolmer and McCulloch [1] describe the topology of a Y machine, discussing its advantages of reduced iron in the stator enabling an improvement in torque density. It comprises a series of coils wound around bars spaced circumferentially around the stator, ideally axially disposed, (ie parallel the rotation axis of the rotor). The rotor has two stages comprising discs provided with permanent magnets that face either end of each coil of the stator. The magnetic path at any stage of operation is: through a first coil into a first magnet on a first stage of the rotor; across a back iron of the rotor to an adjacent second magnet on the first stage; through a second coil of the stator adjacent the first coil; into a first magnet on the second stage of the rotor aligned with the second magnet on the first stage; across the back iron of the second stage to a second magnet on the second stage and aligned with the first magnet on the first stage; and completing the circuit through the first coil.

One difficulty with electric machines generally is to provide adequate cooling. This is a particular problem with a Y machine having a high torque density that significant heat is generated in the coils at high torques and is often a limiting factor in the torques that can be employed, at least for extended periods of time.

Magnetic connection between the coils and the permanent magnets depends on a strong magnetic field being developed through the coils, either by the magnets in the case of a generator or by the coils themselves in the case of a motor and the permeability of the magnetic circuit should be as low as possible to permit the maximum flux density through the coils. For this purpose a high permeability core or bar is provided around which the coils are wound. However, the bar is preferably laminated or otherwise arranged to reduce the incidence of eddy currents in the bar. Also, the bars are preferably provided with shoes to spread the flux in the air gap and reduce the flux density therein—the air gap is of high reluctance and increasing its area reduces that reluctance, and that means that less permanent magnet material can be used. It is desirable to reduce the amount of such material to a minimum.

WO-A-2006/066740 discloses a Y machine comprising a housing having a cylindrical sleeve mounting stator coils internally, the sleeve being hollow whereby cooling medium is circulated. However, the coils are embedded in a thermally conducting material to carry heat to the stator housing. A rotor is rotatably journalled in the housing. The stator bars appear to be laminated, as they are in GB-A-2379093 that also discloses a Y machine, as does WO-A-03/094327.

U.S. Pat. No. 6,720,688 discloses a Y machine in which the rotor acts as a vane pump to circulate fluid within a chamber defined by a stator housing through which a rotor shaft, supported on bearings in the housing and carrying the rotor, extends. The fluid cools stator coils. US-A-2005/0035676 discloses another Y machine, particularly adapted for gearless drive of a vehicle wheel.

US-A-2007/0046124 discloses a Y machine in which the rotor has two circumferentially arrayed rows of alternating segments of permanent magnets and ferromagnetic pole pieces.

Copending international patent applications, publication numbers WO-A-2010/092400 ("A1"), WO-A-2010/092403 ("A2") and WO-A-2010/092402 ("A3"), disclose respectively various aspects of cooling, flux management and modular arrangement of Y machines. The entire contents of each application is incorporated herein by reference.

A1 discloses an electric machine comprising a rotor having permanent magnets and a stator having coils wound on stator bars for interaction with the magnets across an air gap defined between them, wherein the bars and coils thereon are enclosed by a stator housing that extends between the air gap and defines a chamber incorporating cooling medium to cool the coils.

The stator housing may comprise two annular plates and two cylindrical walls, the annular plates including recesses to locate the bars within the chamber. Preferably, the material of the stator housing is non-magnetic and non-conducting. However, in the case of the separate annular plates and cylindrical walls, said cylindrical walls are preferably aluminium and said annular plates are plastics material. Alternatively, said annular plates may be integral with said cylindrical walls, which cylindrical walls are in this case split around their circumference and connected together along inner and outer circumferential seams. The split may be central defining two clamshells. The clamshells may be substantially identical, possibly being "mirror" images so that they fit one another, facilitating seam welding around the joins at the splits. The clamshells may be plastics.

The annular plates may be thinned at the ends of the bar to minimize the gap between the bars and the magnets on the rotor. The cylindrical walls may be an inner and outer wall, said outer wall having means to mount the machine and said inner walls comprising means to mount bearings for the rotor.

In A2, an axial flux electric machine comprises a rotor having permanent magnets spaced circumferentially on first and second stages of the rotor and a stator disposed between said stages and having coils wound on stator bars of the stator for magnetic interaction with the magnets across an air gap defined between the rotor and stator, wherein the bars have a shoe at each end of each bar that links magnetic flux through the bars with said magnets on each stage, and wherein the stator is a casting of at least two annular components, each comprising a ring of connected shoes and one including some or all the bars or parts of them and the other comprising any remaining bars or parts of them, said coils being disposed on the bars before the annular components are connected together to complete construction of said stator. The annular components may be identical, and may each comprise half of each bar, and be provided with interfaces adapted to facilitate connection.

Also disclosed and described in A2 is an electric machine comprising a rotor having permanent magnets and a stator having coils wound on stator bars for interaction with the magnets across an air gap defined between them, wherein the bars have shoes that link magnetic flux through the bars with said magnets, and wherein the bars and shoes are formed separately from one another and at least a part of each is formed by moulding soft-iron particles so that the particles have a short dimension that is arranged transverse a reluctance-plane, and the bars and shoes are assembled so that said reluctance-plane of the bar is parallel a longitudinal axis of the bar and said reluctance-plane of the shoe is transverse said longitudinal axis.

The alignment of the short dimension of the particles transverse said reluctance-planes results in each reluctance-plane having a minimum reluctance. The particles of at least the bars may have a single longitudinal dimension and said particles may be also aligned so that their longitudinal dimension is parallel a reluctance-direction in said reluctance-plane, said reluctance-direction of the bars being parallel said longitudinal axis of the bar. If the particles of the shoes have a single longitudinal dimension, preferably said reluctance-direction is radial with respect to said longitudinal axis when the bars and shoes are assembled.

In A3, the rotor stages may each comprise an annular dish, whose outer rims mount said permanent magnets and whose inner rims are connected together enclosing said bearings. The rotor stages are dish-shaped to increase their rigidity in a radial plane (ie a plane perpendicular to the rotation axis of the rotor and also, preferably, perpendicular to the stator bars). Each said inner rim may comprise a cylindrical flange with an interface for mutual inter-engagement. A spacer may be provided between the cylindrical flanges to adjust preload on the bearing. The cylindrical flanges can include bosses arranged parallel said rotor axis to receive fasteners for clamping said rotor stages together.

The present invention is concerned with aspects of the clamshell housing of the stator coils, whereby manufacture of the machine is facilitated.

US-A-2006/0043821 discloses over-moulding of components of the machine. This is effected in two stages. First of all, stator bars are over moulded with a bobbin shaped sleeve having flanges on which are then wound coils that are temporarily assembled using a location ring or series of connectors. The assembled bars and coils are inserted into a mould whereupon the entire stator is formed as an annular plate by injection moulding. A similar arrangement is disclosed in WO-A-01/06623.

BRIEF SUMMARY OF THE DISCLOSURE

In accordance with the present invention there is provided an electric machine comprising a rotor having permanent magnets and a stator having coils wound on stator bars for interaction with the magnets across an air gap defined between them, the rotor being journalled for rotation with respect to the stator about a rotation axis wherein the bars and coils thereon are enclosed by an annular stator housing and wherein the stator housing comprises two mating clamshells that mount the stator bars and coils in the machine, each stator bar having shoes at each end and each clamshell having cylindrical wall parts on inner and outer radii and a radial wall joining the inner and outer cylindrical wall parts, whereby the two clamshells are mated between facing edges of said inner and outer cylindrical wall parts to form said stator housing, and in which the clamshells define between them a chamber through which cooling medium is circulated around the coils to cool them, characterised in that each bar is formed from at least two bar parts interconnected at a transverse split across the section of the bar and in that each clamshell is injection moulded from reinforced plastics, being overmoulded around the shoes of one bar part the stator bar to retain and position in the radial wall said bar parts whereby said shoes form part of said radial wall.

In accordance with the present invention there is also provided a method of construction of a machine as defined above comprising the steps of:
a) assembling the bar parts of the stator bars in a clamshell mould provided with spaces therefor,
b) closing the mould and injecting molten reinforced plastics material into the mould,
c) solidifying the plastics material and opening the mould to release a so-formed clamshell, and
d) assembling the stator by connecting two concentric faces of the two clamshells together and simultaneously joining said bar parts at said split, the mould thereby serving as a jig to position the stator bars in the machine.

More broadly, the invention provides a method of constructing an electric machine of the type comprising a rotor having permanent magnets and a stator having coils wound on stator bars for interaction with the magnets across an air gap defined between them, wherein the bars and coils thereon are enclosed by an annular stator housing, the method comprising the steps of:
a) providing a first mould;
b) disposing first shoes of the stator bars in the first mould;
c) closing the first mould and injecting molten reinforced plastics material into the first mould;
d) opening the first mould after cooling and ejecting a first clamshell in which said first shoes are retained in the plastics moulded material of the first clamshell;
e) providing a second mould;
f) disposing second shoes of the stator bars in the second mould;
g) closing the second mould and injecting molten reinforced plastics material into the second mould;
h) opening the second mould after cooling and ejecting a second clamshell in which said second shoes are retained in the plastics moulded material of the second clamshell;
i) wherein the first and second clamshells are each formed with cylindrical wall parts on inner and outer radii and a radial wall joining the inner and outer cylindrical wall parts;
j) mounting stator coils on the stator bars;
k) connecting together facing edges of said inner and outer cylindrical wall parts of the first and second clamshell housings to form said stator housing, whereby respective first and second stator shoes of each clamshell housing are mated together, securing the stator coils therebetween; and
l) assembling the stator housing with the rotor.

It is to be understood that connecting mating facing edges of said inner and outer cylindrical wall parts and mating clamshells includes within its scope mating through the agency of another component.

Specifically, however, an electric machine may comprise a rotor having permanent magnets and a stator having coils wound on stator bars for interaction with the magnets across an air gap defined between them, the rotor being journalled for rotation with respect to the stator about a rotation axis wherein the bars and coils thereon are enclosed by an annular stator housing and wherein the stator housing mounts the stator bars and coils in the machine, said stator housing having cylindrical wall parts on inner and outer radii and a radial wall joining the inner and outer cylindrical wall parts defining an annular chamber through which cooling medium can be circulated around the coils to cool them, characterised in that each bar is formed from at least two bar parts interconnected at a transverse split across the section of the bar and in that each radial wall is injection moulded from reinforced plastics, being overmoulded around the shoes of one bar part the stator bar to retain and position in the radial wall said bar parts whereby said shoes form part of said radial wall.

The outer cylindrical wall part may be aluminium, forming a housing of the machine, and the inner cylindrical wall part may be steel, forming a mounting ring for a bearing that journals the rotor in the stator.

Each radial wall may extend through the air gap and is thinned where the shoes of each bar are retained to minimize the gap between the bars and the magnets on the rotor.

By overmoulding the stator shoes in the clamshell, the position of them in the machine can be fixed, the mould serving as a jig to hold the stator shoes in correct position with respect to one another and the clamshell serving to maintain that juxtaposition during assembly. In addition, the stator shoes being moulded in the clamshells, which are ultimately connected together to form the stator, provides a rigid construction of the stator, enabling the air gap between the stator shoes and rotor magnets to be minimised, whereby the efficiency of the machine is enhanced.

In accordance with other aspects of the present invention, there is provided electric machines that incorporate some or all of the foregoing aspects (where they are not mutually exclusive), such combinations being evident to the skilled person. Whereas the following description of specific embodiments may include or exclude different aspects mentioned above, this is not to be understood as being significant.

BRIEF DESCRIPTION OF THE DRAWINGS

Embodiments of the invention are further described hereinafter with reference to the accompanying drawings, in which:

FIGS. 4a, b, c and d are respectively an exploded perspective view of a stator bar and shoes of an embodiment of electric machine, an end view of another embodiment of bar, an end view of a further embodiment of bar, and a perspective view of a composite stator bar and resultant flux paths;

FIGS. 6a and b are respectively a cutaway detail view of the stator housing of the machine of FIGS. 5a to c, viewed in the direction of the Arrow X in FIG. 5c, and a section on the line AA-AA in FIG. 6a;

FIGS. 12 a and b show respectively an exploded view of a motor also in accordance with a further embodiment of the present invention, and a side section therethrough.

DETAILED DESCRIPTION

Figure 1:
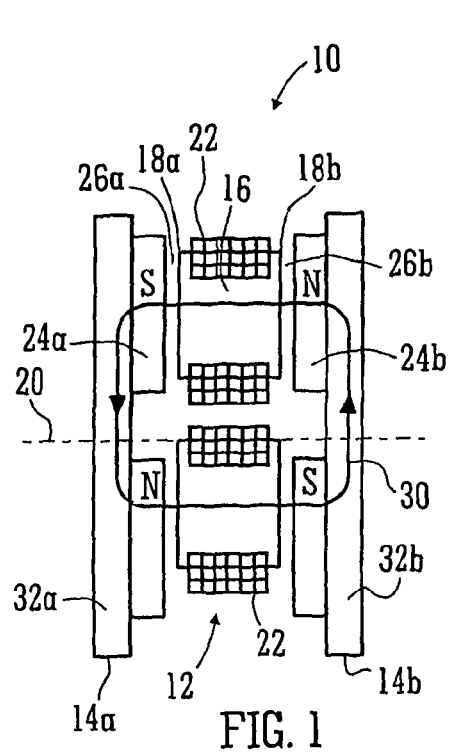
FIG. 1 is a schematic side view of a yokeless and segmented armature machine to which the present invention primarily (but not exclusively) relates.
Figure 2:
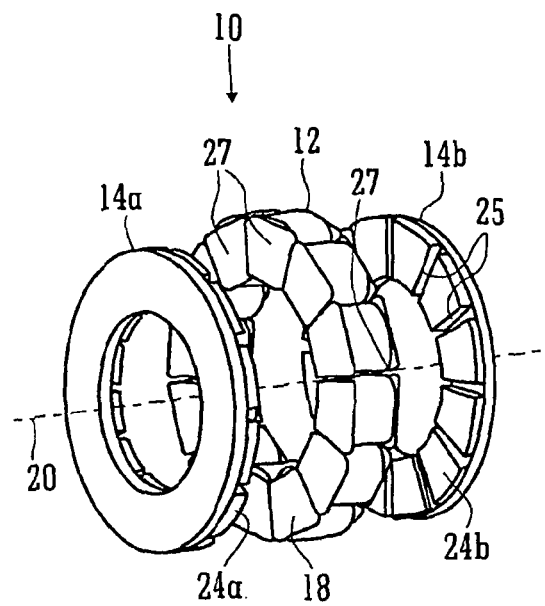
FIG. 2 is a perspective view of the arrangements of FIG. 1.

A yokeless and segmented armature machine 10 is illustrated schematically in FIG. 1. The machine 10 comprises a stator 12 and two rotors 14a,b. The stator 12 is a collection of separate stator bars 16 spaced circumferentially about a rotation axis 20 of the rotors 14a,b. Each bar 16 has its own axis 16a which is disposed parallel to the rotation axis 20. However, that is not absolutely essential. In an axial flux machine, the axis 16a is indeed parallel the rotation axis 20. However, it can be disposed at any angle thereto, even radially with respect to the rotation axis 20. The following discussion is in respect of an axial flux machine, but this should not be understood to be limiting in any sense and, where the context permits, the invention equally applies to other inclinations of the stator bars 16.

Each end of each stator bar is provided with a shoe 18a,b which serves a physical purpose of confining a coil stack 22, which stack 22 is preferably of square section insulated wire (or possibly rectangular section) so that a high fill factor can be achieved. The coils 22 are connected to an electrical circuit (not shown) that (in the case of a motor) energizes the coils so that the poles of the resultant magnetic fields generated by the current flowing in the coils is opposite in adjacent stator coils 22.

The two rotors 14a,b carry permanent magnets 24a,b that face one another with the stator coil 22 between. Indeed, in the axial flux machine, the rotors and their magnets are radially disposed, but when the stator bars are inclined, then they are likewise. Two air gaps 26a,b are disposed between respective shoe and magnet pairs 18a/24a, 18b/24b. There are an even number of coils and magnets spaced around the axis of rotation 20 and, preferably, there are a different number of coils and magnets so that the coils do not all come into registration with the corresponding magnet pair the same time and at the same rotational position of the rotor with respect to the stator. This serves to reduce cogging.

In a motor (with which the present invention is primarily concerned) the above-mentioned electric circuit is arranged to energize the coils 22 so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12, which is generally fixed (for example in a housing, not shown). One advantage provided by the arrangement is illustrated in FIG. 1 in that the magnetic circuit 30 is provided by two adjacent stator bars 16 and two magnet pairs 24a,b. Thus, no yolk is required for the stator 12, although a back iron 32a,b is required for each rotor linking the flux between the back of each magnet 24a,b facing away from the respective coils 22.

Thus, in the case of a motor, by appropriate energization of the coils 22, the rotor 14a,b can be urged to rotate about the axis 20. Of course, in the situation of a generator, rotation of the rotor 14a,b induces currents in the stator coils 12 according to the changing magnetic flux induced in the stator bars 16 as the rotors 14a,b rotate.

However, in either case heat is generated in the coils 22 and the efficiency of the machine is reduced, and its capacity limited, if this heat is not removed. Accordingly, the present invention suggests enclosing the stator coils 16 within a housing that extends through the air gap 26a,b and which defines a chamber supplied with a cooling medium.

Figure 3:
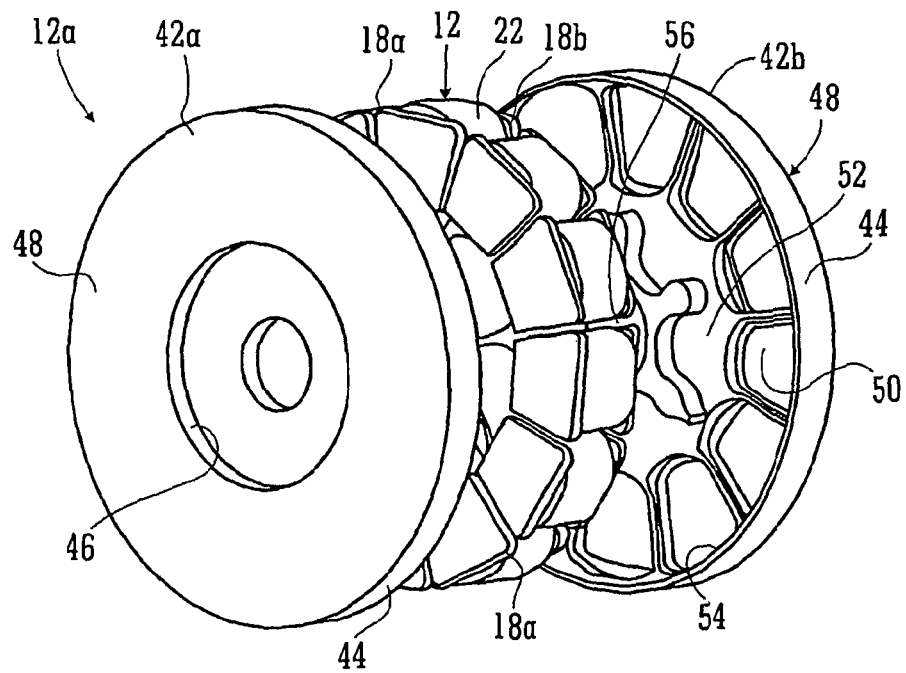
FIG. 3 is a perspective exploded view of a stator housing and stator of a machine in accordance with an aspect of the present invention.

Turning to FIG. 3, a stator 12a is shown in which the stator coils are located between plastics material clam shells 42a,b. These clamshells have external cylindrical walls 44, internal cylindrical walls 46, and annular radially disposed walls 48. The annular walls 48 include internal pockets 50 to receive the shoes 18a,b of the stator bars 16 and serve to locate the stator coil assemblies 16, 22, 18a,b when the two clam shell housings 42a,b of the stator 12a are assembled together. The stator housing 42a,b defines spaces 52 internally of the coils 22 and also externally at 54 around the outside of the coils 22. Furthermore, there are spaces 56 between the coils. The spaces 52,54,56 are interlinked defining a cooling chamber.

Although not shown in FIG. 3, when assembled, the stator housing 42a,b is provided with ports that allow cooling medium (preferably electrically non-conducting liquid) to be pumped into the spaces 52,54,56 to circulate around the coils and cool them. Indeed, being made, preferably, from a plastics material such as polycarbonate or other low heat-conducting material, heat generated by the coils and conducted into the shoes 18a,b is retained within the housing and is not transmitted to the magnets 24a,b, which are particularly susceptible to heat.

A preferred arrangement involves construction of the machine as described above (or as described further below) and then, when complete, filling the spaces 52,54,56 with a settable liquid resin or lacquer that wets all the internal surfaces of those spaces, including the coils 22. Once the resin has had the opportunity to penetrate every space it is drained from the machine leaving only a surface coating of the resin inside the chamber defined by the spaces 52,54,56. Thereafter the resin cures to form an electrically insulating layer that separates the spaces 52,54,56 from coils 22. By this means, water can be employed as the cooling medium. Suitable lacquers are within the knowledge of a person skilled in the art.

It is well known that coil cores for electric machines are frequently made from steel laminations. Steel is an excellent conductor of a magnetic field—it has a low magnetic reluctance and provides a low reluctance path and has low hysteresis loss. However, a problem with most ferromagnetic materials is that they are generally also electrical conductors. Therefore, the changing flux through an electrical conductor creates eddy currents. These are minimized by employing laminations that are separated by an insulator, with the insulation being parallel to the desired flux direction so that transverse electrical currents are minimized. However, a new technique is meeting with some success employing soft-iron particles coated with insulation and moulded to a desired shape (soft magnetic composites—SMC), being bound together by the resinous insulation. A high-pressure compaction process is used to mould the component into a complex shape, capable of producing three-dimensional magnetic flux patterns with an excellent form factor and enabling a high fill factor winding to be employed, wound straight onto SMC teeth.

Indeed, in an embodiment of an electric machine, the problem of minimizing the reluctance of the material of the stator bar and shoe in the direction of the magnetic flux is addressed in the arrangement of FIGS. 4a to d. Thus while SMC material is very suitable it should be noted that, although coated soft-iron particles have the capacity to reduce eddy currents and generally to have a low magnetic reluctance in all directions, they do not have the best, that is to say, the minimum reluctance possible, which is still in the domain of laminations, at least in the plane or direction of the laminations.

In this aspect, it is suggested to employ such particles in the construction of the stator bar 16 and shoes 18, but arranging them so that they have a preferential direction, or at least plane, of low reluctance, which is preferably lower than normally provided by such particles. In the case of the bar 16, this preferential direction is in planes parallel to the axis 16a. In the case of the shoes 18, a minimum reluctance is desirably arranged in planes perpendicular to the longitudinal axis 16a. This can be provided in several ways, although fundamental is the separate construction of the bar 16 and shoes 18, as shown in FIG. 4a, and their subsequent assembly.

Thus, the bar 16 of FIG. 4a is manufactured from round, insulation-coated, soft-iron particles. These particles are first flattened into disc-like components, before being placed into a mould and finally pressed together. The mould is arranged so that the direction of pressing of the particles, and their initial distribution prior to pressing, is such that the major dimensions of the particles lie in a plane that is parallel to the axis 16a. This might most conveniently be achieved, albeit only partially, by commencing with essentially round particles in the mould and pressing them together in a direction perpendicular to the axis 16a. For example, pressing upwardly in the direction of the Arrow A not only flattens the particles in a plane orthogonal to the direction A, but also tends to spread them in the direction of the Arrows B.

Ideally, however, the particles are elongate and are arranged in the mould with their long axis parallel to the axis 16a. This can be achieved by employing a magnetic field to align the particles. In that event, the line of minimum flux for the component is not just in planes parallel to the axis 16a, but actually in that specific direction.

On the other hand, the shoes 18 are preferably manufactured by pressing round particles in a direction parallel to the axis 16a so that, during the compaction process, they spread laterally in the plane perpendicular to the axis 16a. When the shoes 18 and bar 16 are assembled together, the magnetic flux can therefore travel with minimum reluctance through the bar 16 in the direction of the longitudinal axis 16a and exit the bars 16 both in the direction of the axis 16 from the end 16d of the bars to enter directly the air gaps 26a,b, but also orthogonally into the shoe peripheries 18c, as can be seen from the magnetic flux arrows indicated in FIG. 4d.

In a preferred arrangement, the stator bars 16 also comprise a lamination roll, which can improve the directional bias of minimum reluctance. Thus, in FIG. 4b, a roll 90 of insulation-coated steel is arranged in a mould (not shown) with its axis parallel the (ultimate) axis 16a of the bar 16b to be formed. The mould is then filled with particles that are pressed and compacted around the lamination roll so that a plane of minimum reluctance of the particles is parallel the axis 16a. They surround the roll 90 and give the bar its desired trapezium-shaped section.

An alternative construction in FIG. 4c has a trapezium-shaped core 92 of pressed soft-iron particles having at least a plane of minimum reluctance parallel the axis 16a. A lamination roll 94 is then wound around the core 92 and results in a stator bar 16c having the desired external sectional shape.

Both the bars 16b,c of FIGS. 4b and c each have preferential directions of minimum reluctance parallel to the axis 16a. Collars 18c, formed from pressed, soft iron particles, have minimum reluctance planes perpendicular to the axis 16a. When assembled, the bar and collars result in a stator core that has an extremely low-reluctance and is directionally optimized. Alternatively, instead of collars 18c, end plates (or shoe elements—not shown) could be employed against which the ends of bar elements 16 are butted to complete the construction. The shoe elements and ends of the bar elements could have corresponding mating features (not shown in FIGS. 4a-d) that align one with respect to the other. Even then, such endplates could be constructed with a central region having an axial direction of minimum reluctance and a collar such as collar 18c with a radial direction of minimum reluctance.

Figure 5A:
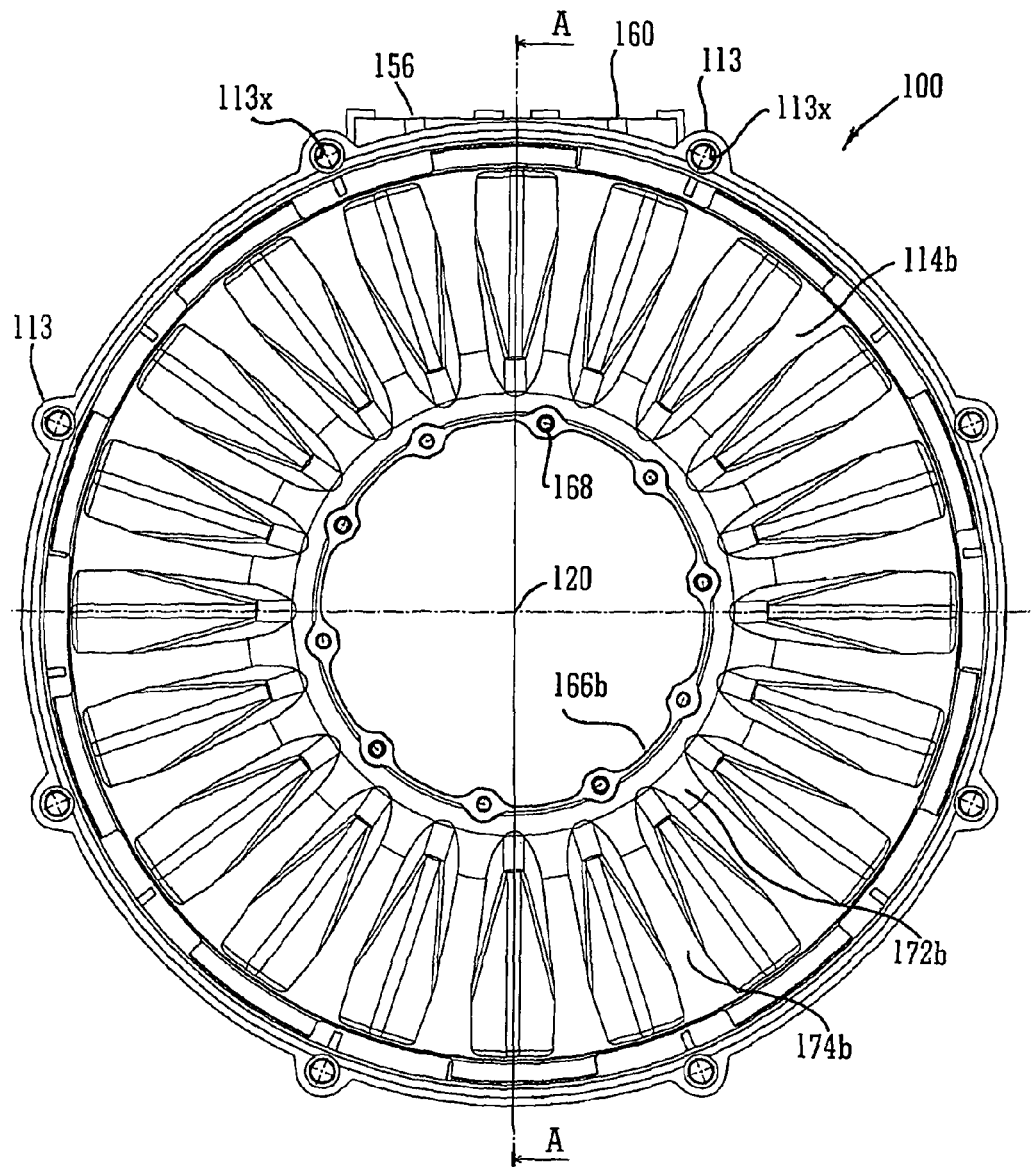
FIGS. 5a,b and c are respectively a plan view of one embodiment of a machine in accordance with an aspect of the present invention; a section on the line A-A in FIG. 5a, and an exploded perspective view of the same machine.

An embodiment of the invention is described with reference to FIGS. 5a,b and c illustrating a particular construction of motor 100. Again, while a motor is described, it should be understood that the principles also apply directly to a generator. The motor 100 is, in fact, a single motor slice and two or more of them may be bolted together, as described further below. Each motor has a tubular stator housing 102a,b having radially planar end faces 104a,b between inner (108a,b) and outer (106a,b) cylindrical side walls. The radially outer cylindrical wall 106a,b each have an external circumferential flange extension 110a,b that define radially planar end faces 112a,b of the motor. Indeed, the stator housings 102a,b constitute the housing for the motor itself. Several housings 102a,b can be bolted together end to end by bolts and nuts (not shown) passing through bosses 113 (see FIG. 5c) arranged around the housings 102a,b. Indeed, the motor 100 can be mounted in a vehicle, for instance, using the bosses 113 as mounting flanges.

Despite being bolted together and being a composite motor 100, each motor slice 100 can be independent of one another, as described further below, and can be driven at its own speed and torque, as required by a motor management system, which is not described further herein. However, as also explained further below, the motor slices 102 could be connected to a single output drive, thereby doubling the output torque available. Indeed, there is no limit to the number of motor slices that can be stacked together.

The housings 102a,b define a stator housing when mated together, through their internal end faces 113a,b and 115a,b of the radially outer and inner cylindrical walls 106a,b 108a,b respectively. An annular chamber 53 is enclosed thereby and contains, locates and fixes a plurality of stator coils 122 mounted on stator bars 116 having shoes 118a,b. Indeed, as described further below, the shoes at least of the stator bars are overmoulded in the material of the stator housings 102a,b. The coils 122 are spaced circumferentially around the rotor axis 120a, as shown in FIG. 5c and there are 24 of them in that motor (see also FIG. 10). Each stator coil shoe 118a,b is received in a pocket 150 of chamber 53. The housings 102a,b are moulded from non-electrically conducting, non-magnetic material, preferably glass or other fibre reinforced polymer such as nylon. The housings are in clamshell form.

Figure 5B:
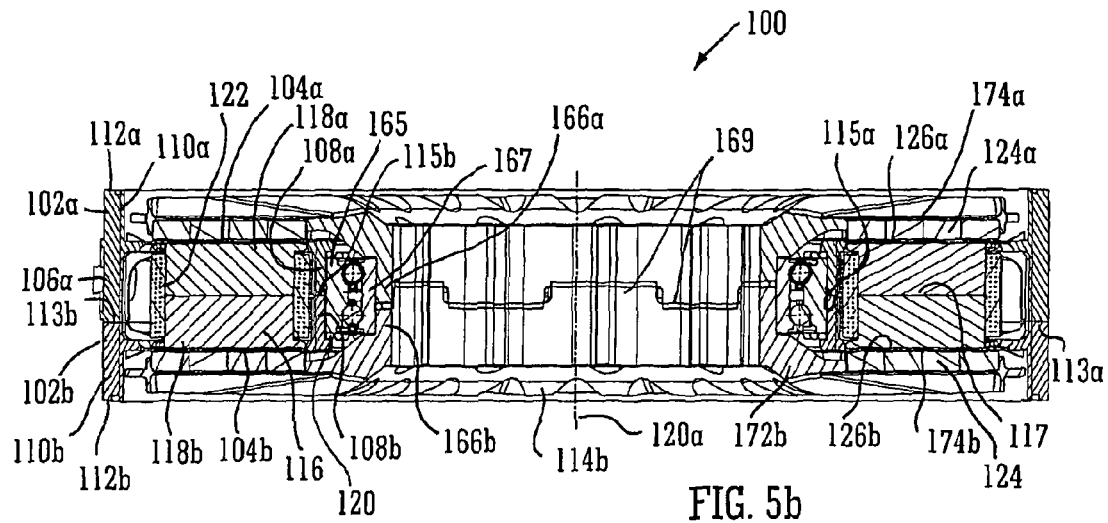
Figure 5C:
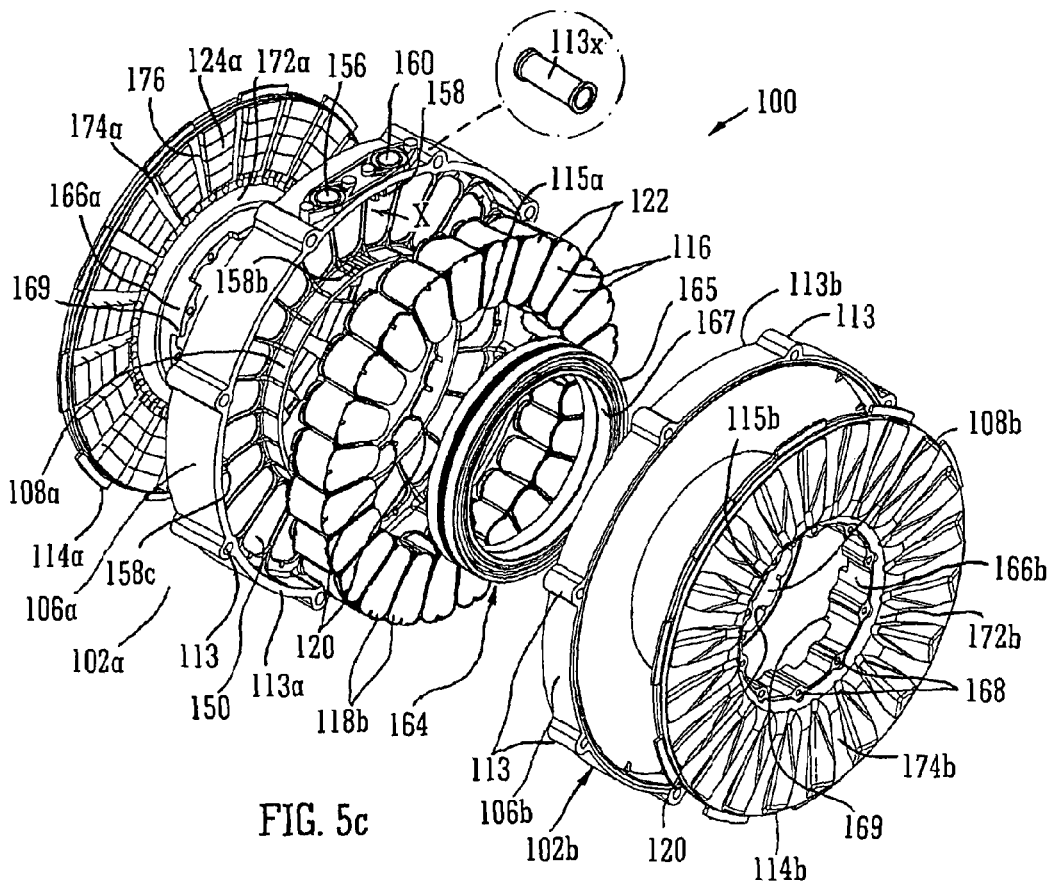

In FIG. 5b, the stator bars 116 can be seen to be constructed in two halves with integral shoes 118a,b on half of each bar which is split down a centre line 117. The clamshells 102a,b are moulded in a mould (not shown) and, prior to moulding, the shoes 118a,b of the stator bars are located in spaces in the mould so that, when the plastics is injected into the mould, the shoes 118a,b are fixed in the respective pockets 150. Once the clamshells are moulded, coils are slipped over each bar, the wiring of which is handled as described further below.

Finally, the outer race 165 of a bearing 164 is located on step 120 of the inner cylindrical wall 108a,b. When the clamshells 102a,b are mated together, further adhesive bonds the faces 117 of the bars 116 together and the bearing outer race is captured. Indeed, the whole bearing 164 is most likely preassembled and captured by the steps 120, the bearing having an inner race 167. The bearing may be supplied with its roller elements preloaded (as shown in FIG. 5b), but the inner race could be split (as shown in FIG. 5c) whereby clamping of the inner race effects the requisite preload. Indeed, the steps 120 may be replaced by a solid metallic ring (not shown) overmoulded in the clamshell on which the bearing outer race 165 is seated.

Rotors 114a,b rotors are connected together through internal flanges 166a,b. These are tubular and are provided with spaced bosses 168 to receive nuts and bolts (not shown) that connect the two rotors 114a,b together. Thus, the rotors 114a,b are, to all intents and purposes, a single, integral structure. Extending from the cylindrical flanges 166a,b are dish-shaped wings 172a,b that terminate in an annular section 174a,b on which magnets 124a,b are mounted. Indeed, the extensions 174a,b are preferably provided with pockets 176 to receive the magnets and firmly locate them. The internal flanges 166a,b have interdigitating fingers 169 and clamp the inner race 167 of the bearing 164 when assembled.

Between the magnets 124a,b and the clamshells 142a,b are air gaps 126a,b. As will be well understood in motor technology, the air gaps should be as small as possible in order to reduce the reluctance of the magnetic circuit. However, the arrangement of the motor described with reference to FIGS. 5a, b and c permits a very narrow air gap to be engineered by virtue of the few manufacturing tolerances that have to be accommodated in assembly of the motor 100a,b. Because the bearing 164 represents a (relatively) significant source of lost motion the rotors are, potentially adapted to apply a pre-stress to the bearings, which pre-stress may be limited by a spacer disposed between them. Of course, the axial dimension of the spacer can be honed to ensure a tight fit. However, apart from the bearing, there are relatively few other components whose tolerances stack up and necessitate a large air gap. Of course, one such component is the stator 112 itself, for which the dimensions of the cylindrical walls 106a,b, 108a,b are critical in ensuring the smallest possible air gap 126a,b, despite the presence of a wall (104a) formed by the clamshell being included therein. Moreover, it is apparent that any stresses in the rotor will result in stresses on the stator housing 112 that it must accommodate. However, the series of stator bars and shoes spanning the chamber 53 provide significant reinforcement within the chamber 53 to render the housing 112 extremely secure in an axial direction.

Furthermore, the concept of mounting the rotor 114 directly in the stator 112 has two further beneficial effects. The first is connected with the general principle of the motor design which demands that the magnets 124 and coils 122 be disposed as far as possible from the rotation axis 120a so that the magnetostrictive force acting between the coils and magnets translates into maximum torque about the rotation axis. This means, however, that, if the fixing of the rotor with respect to the stator is at distance that is not much less than the radius of the magnets/coils, the rotor must be very rigid over that distance. By mounting the rotor directly on the stator that distance is reduced and therefore the rotor need not be so rigid. Alternatively, the air gap can be smaller. Secondly, by connecting the rotor using a dish shaped annulus 172 that transforms into a tubular body 166, a further return path 30' (see FIG. 8) for the magnetic flux is created. At least, this is the case if the rotor is made from a ferromagnetic material. This additional flux path is advantageous because it reduces the requirement for the flux to confine itself to a circumferential direction in the flanges 174 between magnets but also permits an alternative return path for each magnet-coil-magnet circuit. The overall reluctance of the magnetic circuit is thereby reduced.

It should be appreciated that the axial force applied to each rotor due to the magnets is significant, and it increases as the air gap reduces and may be of the order of 7500N per rotor. As a result of this, the axial support of the rotors is extremely important and thus the bearing(s) between the stator and rotor need to provide a strong and stable reaction to this force. If the rotors are perfectly located on either side of the stator, there is a net axial force of zero, but to achieve this requires tight build tolerances and a stiff bearing assembly. However, by mounting the rotor directly inside the stator as described herein, that accuracy is achievable within reasonable cost. The steps 120 against which the bearings seat and locate, axially, is critical in this regard.

Of course, the joint between each cylindrical wall 106a,b, 108a,b is equally critical. The clamshells 102a,b can be identical, mirror images of one another or different. In the embodiments described below they are different, for reasons to be explained. Thus clamshell 102a is provided with grooves 109 (see FIG. 6b) in end faces 111 of the inner and outer cylindrical walls 106a,108a. Corresponding lips (not shown) are provided in the corresponding end faces of the other walls 106b,108b of the clamshell 102b, whereby a labyrinthine connection region (that this radially precise and provides a long leak path as well as a large connection area) is provided. Adhesive bonding is also a potential connection mechanism, at least as a temporary measure during full construction of the motor 100 (since the bolts connecting the bosses 113 will also secure the clamshells together. Seal rings (not shown) may be disposed in the grooves 109. However, it is the faces 111 that determine the axial dimension of the stator 112.

The clamshell 102a is provided with a port boss 154, provided with an inlet port 156 for cooling medium and an outlet port 160. Inside the chamber 53 barriers or blocks 158a,b are formed to abut coils 122 and to divide the chamber 53 into two annular passages so that fluid entering the port 156 circulates around the motor interleaving between various ones of the coils 122 before it can exit the port 160, returning the cooling medium to a pump and heat exchanger (neither shown) from whence it came.

Figure 6A:
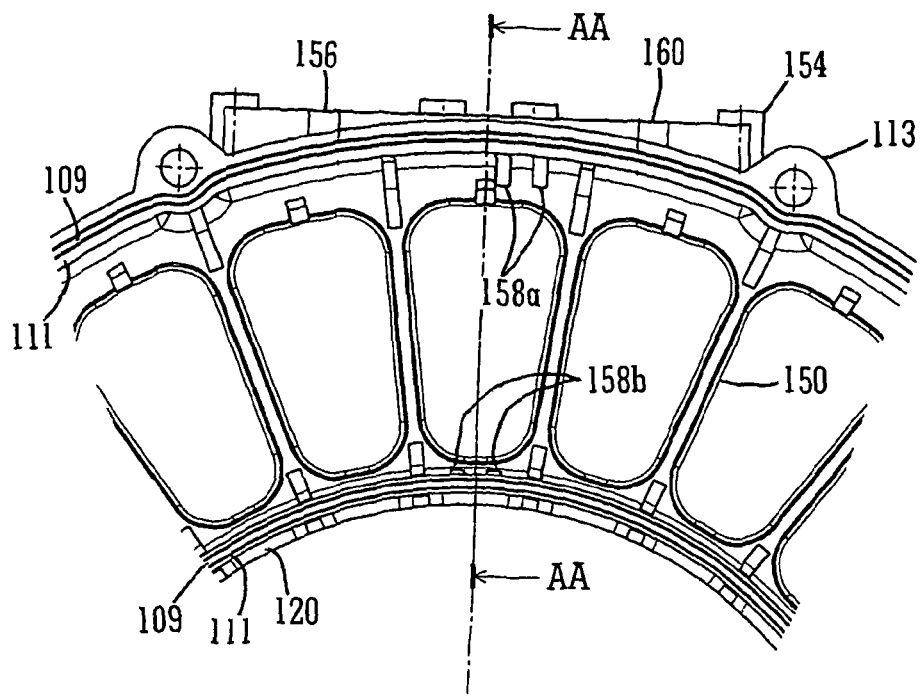
Figure 6B:
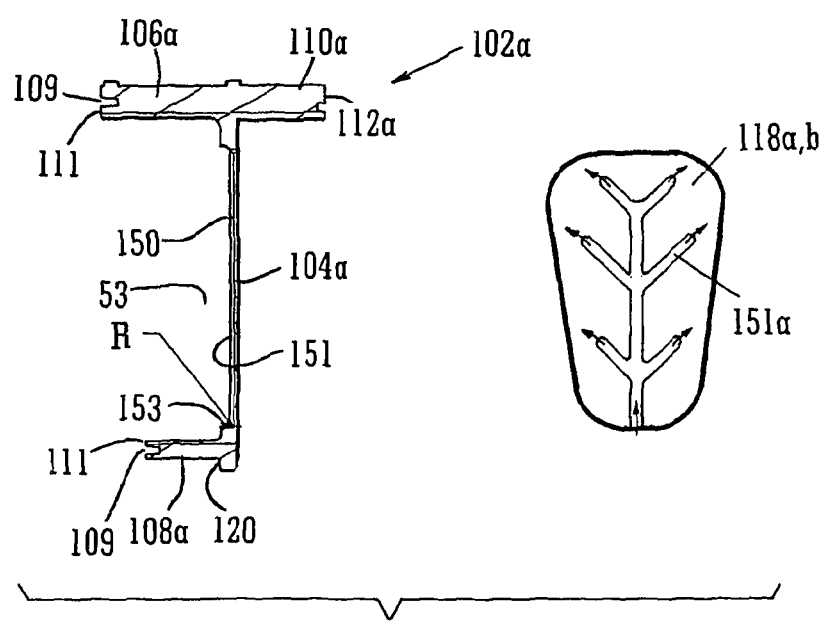

The preferred arrangement has blocks 158a,b that are on either side of the coil between the inlet 156 and outlet 160 (as shown in FIG. 6a), and other blocks (not all visible) are periodically disposed around the machine alternately on the inside and the outside of coils (say, every four coils). By this arrangement the flow enters the inlet 156 and begins around the outside of the machine, but is directed by a first block 158c to transition to the inside of the chamber 53, between different ones of intervening coils 122. From there, flow continues circulation around the machine but is forced by an internal block (not visible but conveniently 180 degrees opposite blocks 158a,b) to transition flow back to the outside of the chamber. Further around the machine, another external block (not visible, but 180 degrees opposite block 158c) obliges transition back to the inside before block 158b forces fluid to transition back to the outside and, finally, to exit the machine through outlet 160. In this scheme, there are four transitions. However, any even number of transitions is possible.

As mentioned above, two motors 100 may be interconnected by bolts passing through two stacks of clamshell housings 112, through aligned bosses 113. In such a case, the motors could be independent with the rotors 114 not being connected to each other. However, they clearly could be, by disposing an appropriate spacer (not shown) between them, and extending the bolts passing through respective bosses 168 so that they pass through both rotors. Indeed, there is nothing to prevent further motors being added in series, so that three or more motors could be employed in tandem.

The (final) sides of the composite motor can be closed by covers (not shown). In the absence of such covers, the width of the machine 100 is defined by the clamshells 102a,b, in particular the external flanges 110a,b that house the rotor stages 114a,b.

The output (not shown) of the motor 100 may comprises any suitable component and may be a shaft. However, typically, in an automotive application, it may be a standard drive hub having a tripod-cup for reception of a shaft (not shown) having a three-lobed yoke. However, it is an aspect of the direct mounting of the rotor on the stator that variation of the output configurations without any disturbance of the motor design is possible. Thus, the shaft-less topology allows for a wide variety of output configurations, including:

Automotive "constant velocity" (CV) joint housing;
Splined shaft (either male or female); and
Flat drive plate with any hole pattern.

It can be seen that by mounting the rotor directly on the stator at a distance from the rotation axis, a substantial hollow space is created inside the rotor. Depending on the application, this provides an opportunity to dispose a gearbox, particularly a planetary gearbox, inside the motor. To some extent, in many circumstances with a machine of the present design, a gear box is not necessary because the electronics required to manage the coils can enable the machine to operate at a substantially constant maximum torque (subject substantially only to cooling limitations) over a wide range of speeds, for example torques of 500 Nm per motor slice, to rotational speeds in excess of 3000 rpm, are feasible. Nevertheless, this option is distinctly available.

This arrangement also has the advantage of facilitating interconnection of machines in tandem, because there is no requirement to disturb the journal arrangement of the rotor in the housing as would normally be the case where the rotor is supported in bearings fixed in the housing. Clearly, there is some scope for debate as to where a stator begins and a housing in which it is fixed ends. Indeed, the invention provides, in motor terms, the following non-exclusive list of options:

(a) A single 500 Nm slice with a spline output;
(b) Two independently-controlled 500 Nm slices, each with their own CV-type output for automotive applications;
(c) Four slices joined as two pairs (1000 Nm per pair), each pair with a CV-type output, again potentially for (high performance) automotive applications;
(d) Four slices fixed rigidly together giving 2000 Nm;

A specific embodiment of the present invention is now described below:

As is evident from the above, the stator housing of the motor 100 is not merely a housing for the stator but is also the housing for the entire motor, subject to any closing covers. Accordingly, it requires structural rigidity that is provided by employing glass or carbon fibre reinforced plastics such as nylon, or more especially a polyphthalamide (PPA). The present invention provides that certain elements are over-moulded by the stator housing during construction of the motor, for various reasons as discussed below.

Referring to FIG. 6a,b, the shoes 118 are not merely positioned in the pocket 150 but are actually moulded into the pocket 150. For this purpose, the pocket may have a small re-entrant to retain the shoe in the pocket after moulding and to facilitate handling. However, this is hardly required because the shoe can be coated with primer to facilitate adhesion of the plastics to the shoe face and sides. Secondly, the sides 153 of the pocket tightly grip the shoe because of the differential shrinkage between shoe and plastics during cooling. Overmoulding of the shoe 118a,b is preferred in any event because it facilitates the forming of the thinning of the end face 104*a*. That is, the shoe face 118*a,b* can be provided with a tree 151*a* of grooves that can assist flow of the plastics material and ensure even and complete coverage over the thinned area. Clearly, such a tree would be possible to form on either side of the mould itself, if the shoe was not being overmoulded; but, in that case, the tree, if it was on the outside face 104*a*, would lead to an effective thickening of the wall preventing the magnets from being disposed close to the face 104*a*. This would require the tree subsequently to be ground off the face to restore the thinness. If the tree was on the inside of the pocket 150, then it would need to match and fit precisely with a corresponding tree formed on the face of the shoe. It clearly could not be a close fit. However, by using the shoe face itself as the mould, not only can registration between tree 151 and grooves 151*a* be assured, but, of course, it is fit between them is complete and adds to the security of the location and retention of the shoe in the pocket 150. The groove tree 151*a* shown in FIG. 6*b* presumes a filling of the mould in the direction of the arrows, that is, radially outwardly from the rotation axis 120*a*.

To assist the molten plastics to flow easily and not solidify too early, the mould may be preheated, as also can be the shoes. The precise temperatures selected will depend on the plastics used, but in the case of polyphthalamide, for example, the mould may be at a temperature of 150° C., whereas the shoes may be at 180° C.

Figure 7A:
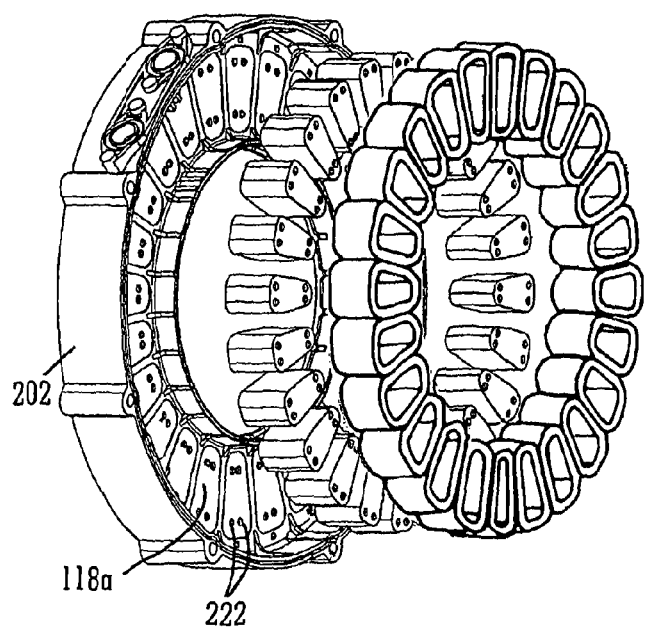
FIGS. 7a and b, 8a and b, 9a and b and 10a and b, are each respectively an exploded perspective view and detailed side section of three arrangements of stator assemblies in accordance with different embodiments the present invention.
Figure 7B:
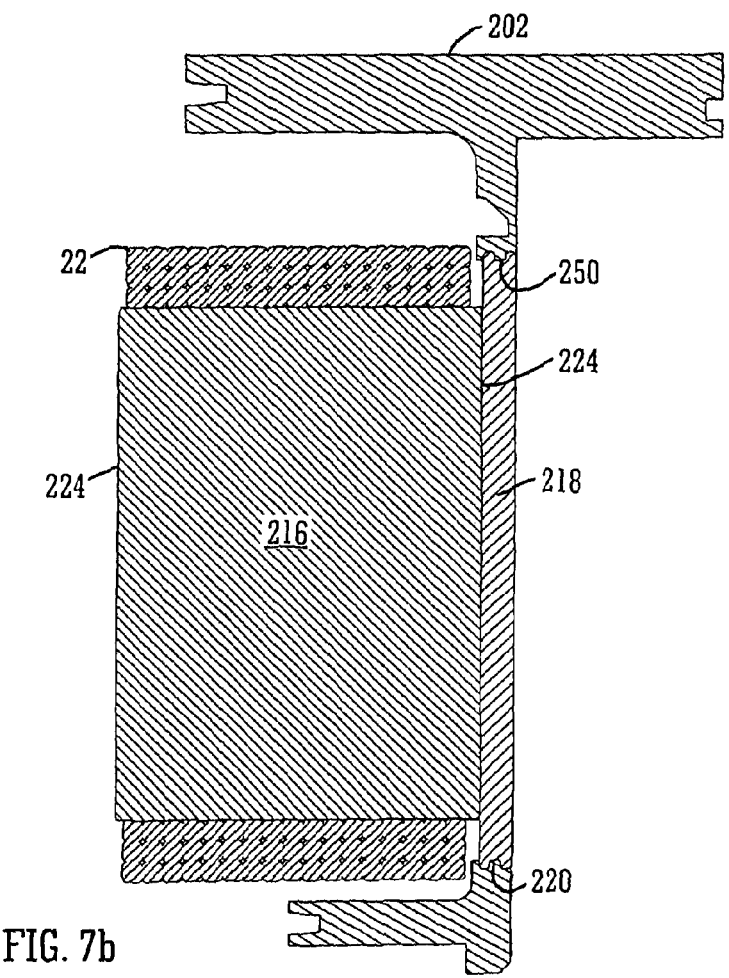

Referring to FIGS. 7*a* and *b*, the thinned wall of pocket of clamshell 202 may be removed altogether and be replaced by a window 250 in which the stator shoe 218 is over-moulded. The shoe has a labyrinthine edge 220, whereby good adhesion, contact and location with respect to the window 150*a* can be effected. When the clamshells 202 are formed with the shoes 218 over-moulded, location features 222 face inwardly. These may be dimples and match corresponding features (ie pimples) on the end faces 224 of stator bars 216, whereby their relative locations in a radial plane may be precisely controlled. Also, improved bonding by adhesion between the stator bar 116 and shoe 218 may be achieved, although it might be preferred to omit adhesive in order to improve magnetic reluctance. It is to be noted that the bars 216 and shoes 218 may be formed from directionally preferential magnetic reluctance material, as described above in relation to FIGS. 4*a* to *d*.

FIGS. 8*a* and *b* show an alternative arrangement (to that of FIGS. 7*a,b*) in which an integral shoe and part bar 317 is over-moulded and fills window 250 of clamshell 302. The face 224 of the bar part 317 has the features 222 described above, but here care has to be taken that the parts 222 interact appropriately. This might be achieved by making the features 222 symmetrical (on reflection) so that two identical bar parts 317 properly interdigitate.

A component optionally also over-moulded by the stator housing is boss reinforcements or sleeves 113*x* (see insert to FIG. 5*c*). These line the bosses 113 and prevent damage to the plastics material when the bolts through the bosses 113 are tightened. However, it is equally possible that such sleeves may be press-fitted after moulding, in which event at least one end of the sleeve 113*x* must be un-flared (both ends are shown flared in FIG. 5*c*).

Figure 9A:
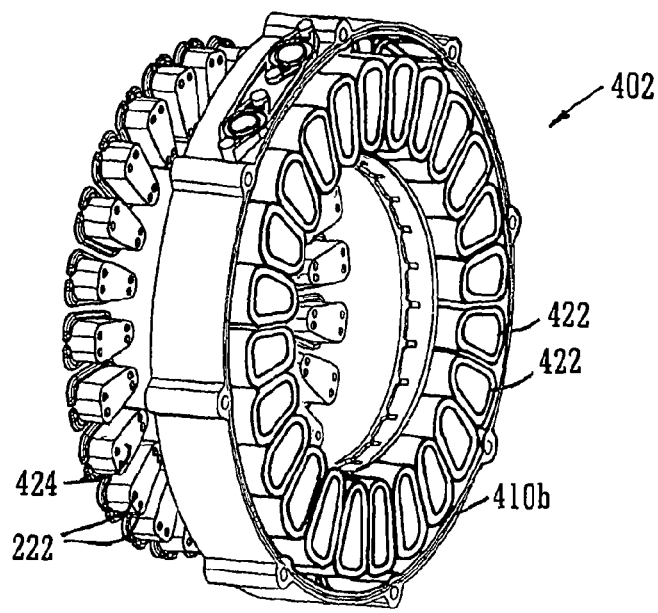
Figure 9B:
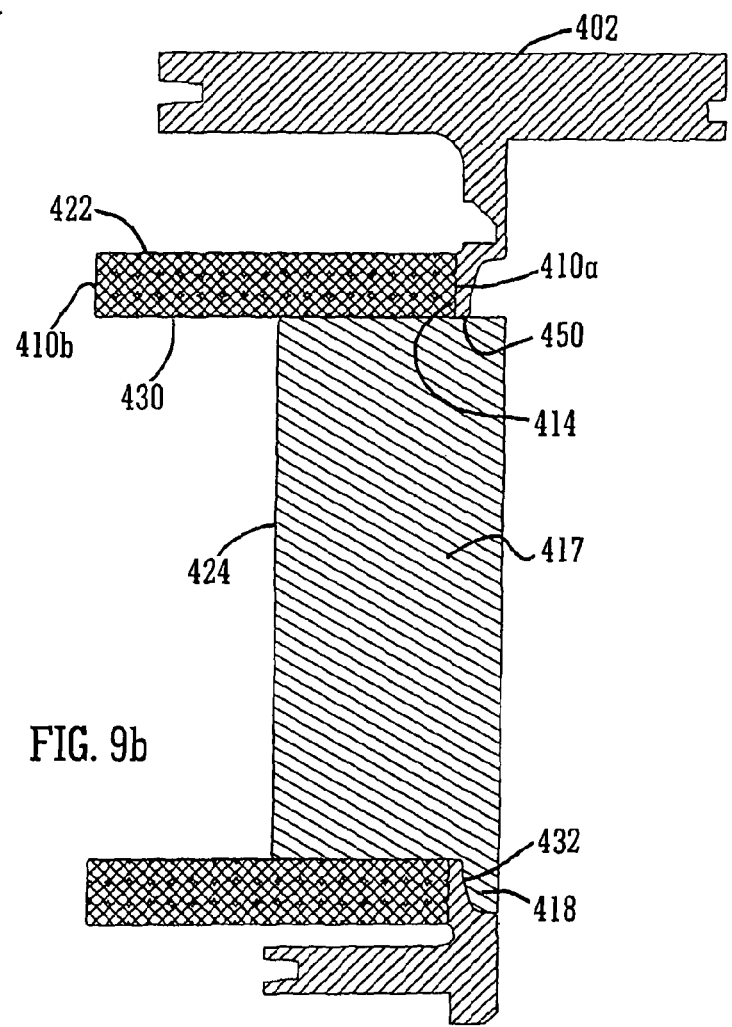

In FIGS. 9*a* and *b*, a coil 422 is over-moulded by the clamshell 402, one edge 410*a* of the coil forming the core for the rim 414 of window 450 of the clamshell 402. When opposing edge 410*b* is butted against the corresponding face (not shown) of the other clamshell, a through bore 430 is formed in which integral bar-elements and shoes 417 may be fitted. An annular pocket 432 provides a seat for the edge 418 of the bar 417 which may be bonded therein. Again, face 424 of each bar-element 417 may have the features 222. However, in accordance with the present invention, both the bar 417 and the coil 422 are overmoulded by the clamshell 402.

In FIGS. 10*a* and *b*, rings 500 are over-moulded in the clamshells 102*a',b'* (which otherwise are identical with the clamshells of FIG. 5*c*) around each pocket 150 in order to reinforce the connection between the clamshell and stator bars 116. It has been found that the corner 502 of the pocket represents a stress concentration that is at least partially relieved by chamfering the corner with a radius R (see FIG. 6*b*). However, the reinforcement rings 500 also counteract the effect of the stresses imposed.

Figure 11B:
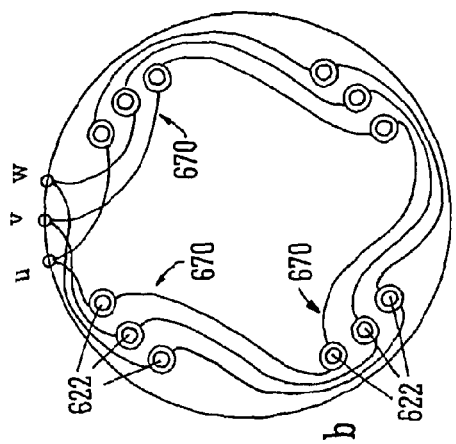
FIG. 11b shows a wiring option.
Figure 11A:
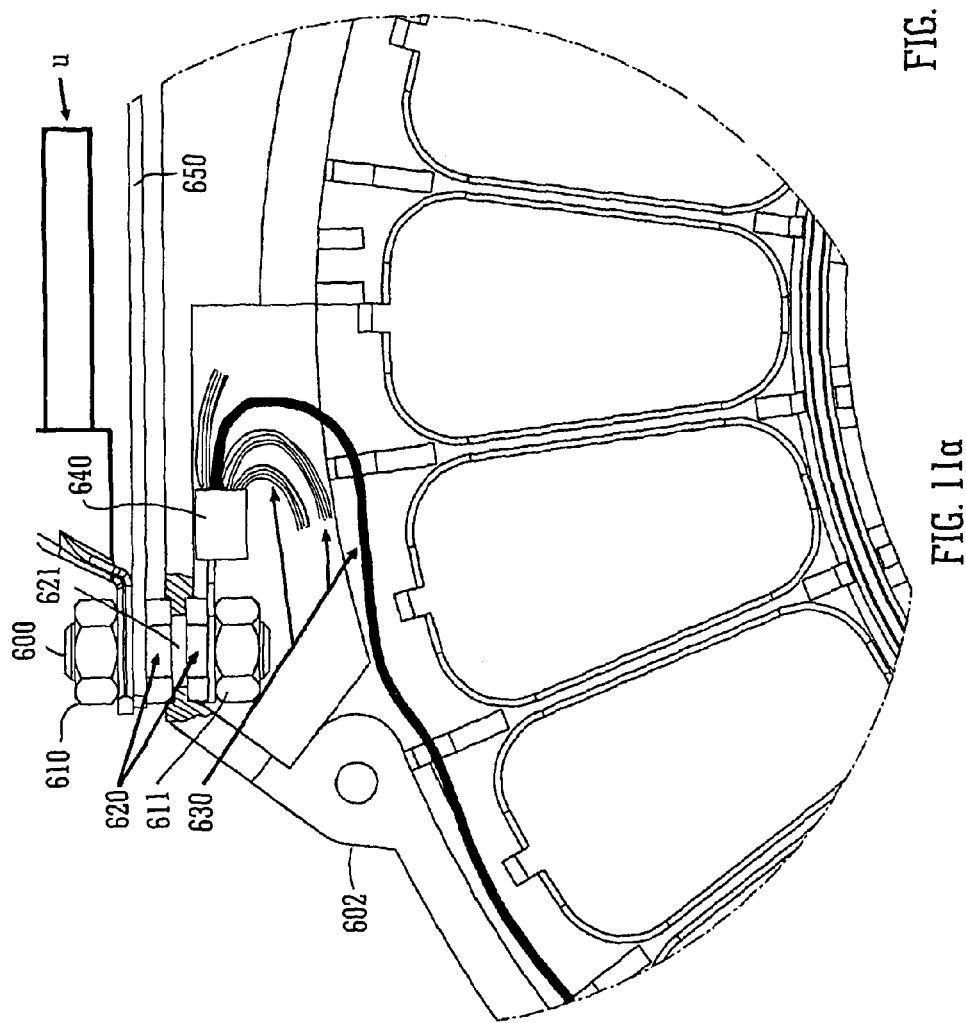
FIG. 11a discloses a detailed side section through a motor in accordance with the invention showing electrical connection arrangements.

In FIGS. 11*a,b* a driving phase conductor u (of three-phase supplies u, v and w) is connected to terminal 600 by a nut 610. Terminal 600 comprises a stud with two hexagonal section flanges 620 separated by a slot 621, the stud being overmoulded in clamshell 602 with the material of the wall both entering the slot 621 in order to locate the stud axially (with respect to its own axis) and also around the hexagonal flanges 620 in order to secure the stud rotationally (again with respect to its own axis). Winding wires 630 from the coils (not shown) can be interconnected with a clamp 640 which is also connected to the underside of the stud 600 by a further nut 611. A bus bar 650 might also connect the terminal to the same phase coils elsewhere on the motor 100 or to a different motor. In FIG. 11*b*, four quadrants 670 of coils 622 for each phase u, v, w are shown. (In a 24 coil motor there are six coils in each quadrant, two for each phase of a three-phase supply). The phase conductor u is connected in series to each first coil in each quadrant at 90 degrees mutual separation (45 degrees with 24 coils) before returning to another phase (ie u to v, v to w, w to u).

Returning to the ports 156,160 (FIG. 6*a*), these may be features of the moulded plastics. However, it is also feasible to over-mould plates that form the seal with conduit connections and/or fastening means in the forms of studs, either over moulded themselves, or integrated with said plates (none of the foregoing being shown).

Finally, as mentioned above, various rings and other metallic components may be overmoulded in the clamshells to help maintain shape and integrity under stress of the plastics material clamshells. In particular, as mentioned above, a ring may be overmoulded in the internal cylindrical walls 108*a,b* in order to support the bearing 164.

Overmoulding components involves creating spaces to receive such components in the mould that forms the clamshell housing. The clamshell housings are ideally formed by two part moulds that open in a single direction, but clearly cores and re-entrants can be formed by additional components. However, assembly of the motor described above is substantially facilitated by fitting the shoes 118*a,b* into appropriate spaces in the mould before the mould is closed. Closing of the mould can only be achieved with the shoes properly positioned and consequently, when injection takes place and the mould is opened after solidification, the shoes are all positioned and retained in the clamshells. The shoes being retained in position then facilitates further assembly of the motor. For example, if the coils are not themselves also overmoulded in the clamshells, then they can easily be positioned on bars that can be located on the shoes using the features 222 (FIG. 7*a,b*). Alternatively, the bars may be integral with the shoes (FIG. 8*a,b*), in which case the coils are simply slipped over them, either within the mould if they are to be overmoulded also, or afterwards during assembly. The coils may be pre-wound on hollow cores, for example, injection moulded sleeves mounted on temporary solid forms for winding.

Whereas in the embodiments of the invention described with reference to FIGS. 5 to 11 involve the moulded clamshells constituting the housing for the machine, as well as for the stator, the embodiment of FIGS. 12 *a* and *b* involves the housing of the machine 1000 as a whole comprising an aluminium or other metallic sleeve 1001. The sleeve 1001 is conveniently of cast material, with machined faces for dimensional accuracy. Clamshells 1002 are identical and comprise a moulded annular disc having an internal circumferential wall or flange 1008 and a small thickening 1006 at its outer circumference. As with the previous embodiments, in particular the embodiment of FIG. 6, the stator bars 1116 each comprise a shoe element 1118 and integral half-bar element 1117 (as per the arrangement of FIG. 10*b*). Indeed, here, each shoe element 1118 is shown with an overhang or undercut 1118*a* whereby the shoe is keyed into the overmoulded material of the clamshell 1002.

Apart from providing the requisite stator housing and chamber wall, the mould (not shown) in which the clamshells 1002 are moulded forms a jig that positions the shoes 1116 precisely in location with respect to one another in the machine 1000, the clamshells 1002 maintaining that positioning after assembly of the machine. In this embodiment, a separate coil assembly 1122 is provided comprising coils 1022 wound in pairs and mounted on a coil jig so that, when the wiring 1670 is completed (for example as in FIG. 11*b*) and clipped to the coils, they are all captured together in a loose circle. A connection plug 1672, with phase pins u, v and w, is attached last and, when this has been done, the coil circle is positioned in the housing 1001 with the plug 1672 attached to socket 1674 being part of the housing 1001. Electrical connection is made but socket 1674 seals the inside of the housing 1001 from the outside.

Next, one of the clamshells 1002 is offered up to one of two internal shoulders 1004 of the housing 1001 and bonded in place using a suitable adhesive between the thickened edge 1006 and the shoulder 1004. In this process, the coils are each looped over the bar elements 1117 of the stator bars 1116. A bearing mounting ring 1200 is then slipped inside the inner cylindrical wall (flange) 1008 and bonded in place. A ridge 1202 of the ring 1200 abuts an end face of the flange 1008 and locates the ring axially. Finally, the second clamshell 1002 is positioned, adhesive having been applied to the end faces 1117*a* of the bar elements 1117 so that each is bonded together. The flange 1006 is also bonded to the other shoulder 1004 of the housing 1001 and to the ring 1200 over which the flange 1008 slips. The ridge 1202 is this clamped between the two clamshells, as can be seen most clearly in FIG. 12*b*. The bearing 1164 can now be located on the ring 1200 which has a shoulder 1208 against which the outer race 1165 of the bearing seats and a groove 1210 in which to receive a circlip to locate the other side of the bearing race. The inner race 1167 mounts the rotor (not shown in FIG. 12*a,b*).

The arrangements described above facilitate construction of the machine as a whole.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

REFERENCES

[1] T J Woolmer and M D McCulloch "Analysis of the Yokeless and Segmented Armature Machine", International Electric Machines and Drives Conference (IEMDC), 3-5 May 2007

The invention claimed is:

1. An electric machine comprising a rotor having permanent magnets and a stator having coils wound on stator bars for interaction with the magnets across an air gap defined between them, the rotor being journalled for rotation with respect to the stator about a rotation axis wherein the bars and coils thereon are enclosed by an annular stator housing and wherein the stator housing comprises two mating clamshells that mount the stator bars and coils in the machine, each stator bar having shoes at each end and each clamshell having cylindrical wall parts on inner and outer radii and a radial wall joining the inner and outer cylindrical wall parts, whereby the two clamshells are connected together between facing edges of said inner and outer cylindrical wall parts to form said stator housing, and in which the clamshells define between them an annular chamber through which cooling medium can be circulated around the coils to cool them, characterised in that each stator bar is formed from at least two bar parts interconnected at a transverse split across the section of the stator bar and in that each clamshell is injection moulded from reinforced plastics, being overmoulded around the shoes of one bar part of the stator bar to retain and position in the radial wall said bar parts whereby said shoes form part of said radial wall.

2. An electric machine as claimed in claim 1, in which the radial wall extends through the air gap and is thinned where the shoes of each bar are retained by the clamshells to minimize the gap between the bars and the magnets on the rotor.

3. An electric machine as claimed in claim 2, in which a pocket is formed internally in the radial wall around the shoe of the stator bar during said overmoulding, the floor of such pocket comprising said thinning, and wherein a transition zone is provided between said thinning and the radial wall whereby stress concentrations are substantially avoided.

4. An electric machine as claimed in claim 3, in which the face of the shoe against said thinning comprises grooves whereby flow of molten plastics material to said thinning throughout its area is facilitated.

5. An electric machine as claimed in claim 1, in which at least some of the stator bar parts each comprise a terminal shoe element and an intermediate bar element, wherein it is the shoe element of each stator bar that is over-moulded by the radial wall during formation of the stator housing.

6. An electric machine as claimed in claim 5, in which each stator bar comprises three components, being two shoe elements and a single bar element.

7. An electric machine as claimed in claim 5, in which each stator bar comprises two bar parts, being two shoe elements, on at least one of which is integrated said bar element.

8. An electric machine as claimed in claim 7, in which the two bar parts are identical, each having a shoe element and a bar element; or one shoe element is no more than a shoe element whereas the other is a shoe element with the entire bar element integrated with it.

9. An electric machine as claimed in claim 1, wherein at least one clamshell has an external flange of the outer cylindrical wall part to provide a recess for reception of the rotor, wherein the stator housing also comprises the housing for the machine.

10. An electric machine as claimed in claim 1, wherein at least one of said inner and outer cylindrical wall parts of the clamshells is connected together through an intermediate component.

11. An electric machine as claimed in claim 10, wherein said intermediate component is between said outer cylindrical wall parts and said intermediate component and comprises a housing of the machine.

12. An electric machine as claimed in claim 11, in which said cylindrical wall parts of the clamshells mated together through a said intermediate component are no more than an edge of said radial wall.

13. An electric machine as claimed in claim 10, wherein said intermediate component is between said inner cylindrical wall parts and said intermediate component comprises a mounting ring for a bearing mounting said rotor in said stator.

14. An electric machine as claimed in claim 10, in which said cylindrical wall parts of the clamshells mated together through a said intermediate component are no more than an edge of said radial wall.

15. An electric machine as claimed in claim 1, wherein one or both clamshells also have over-moulded therein at least one selected from:
   a) cylindrical boss supports extending along the cylindrical outer wall part;
   b) connection studs, to communicate electrically the stator coils externally of the stator housing;
   c) stator coils;
   d) coolant inlet and outlet ports; and
   e) an outer race of a rotor bearing or ring to support said outer race.

16. An electric machine as claimed in claim 15, whereby said cylindrical boss supports form at least one selected from:
   i. means to interconnect the clamshells;
   ii. means to mount the stator housing in the machine; and
   iii. means to mount the machine on a support.

17. An electric machine as claimed in claim 15, wherein the outer race or ring is overmoulded in a first clamshell inner cylindrical wall, which clamshell is not the same as a mating second clamshell, the bearing being centrally located with respect to the axial direction inside the stator housing by the first clamshell having a relatively long inner cylindrical wall, whereby a joint between the inner cylindrical walls of the first and second clamshells is at one end of the stator housing.

18. An electric machine as claimed in claim 1, in which the clamshells are bonded together, or to said intermediate component, using an adhesive; and/or the clamshells are seam welded together.

19. An electric machine as claimed in claim 1, in which the stator bars are parallel the rotation axis, the machine being an axial flux machine, and the rotor being a two stage rotor having one stage at each axial end of the stator bars, said radial walls of the clamshells extending between said inner and outer cylindrical wall parts substantially radially with respect to the rotation axis.

20. A motor comprising a machine as claimed in claim 1.

21. A method of construction of a machine as claimed in claim 1 comprising the steps of:
   a) assembling the bar parts of the stator bars in a clamshell mould provided with spaces therefor,
   b) closing the mould and injecting molten reinforced plastics material into the mould,
   c) solidifying the plastics material and opening the mould to release a so-formed clamshell, and
   d) assembling the stator by connecting two concentric faces of the two clamshells together and simultaneously joining said bar parts at said split,
   the mould thereby serving as a jig to position the stator bars in the machine.

22. A method as claimed in claim 21, wherein said coils are fitted on said bar elements of the stator bars between steps c) and d).

23. A method as claimed in claim 21, wherein said spaces also accommodate said coils and, prior to step b), coils are disposed on bar elements of the stator bar parts, the bar parts also comprising shoe elements forming said shoes, whereby the coils are also over-moulded with said injected molten plastics in step b).

24. A method as claimed claim 21, wherein said clamshells each have axially facing inner and outer circumferential edges that are mated together in step d) and welded, bonded or bolted together to enclose said annular chamber.

25. A method as claimed in claim 21, wherein blocks are moulded on said clamshells in step b) against which the coils abut whereby a flow path is defined for cooling medium.

26. A method as claimed in claim 21, wherein said connecting in step d) is via an intermediate component.

27. A method as claimed in claim 21, wherein, after said coils are fitted on said bar elements of the stator bars between steps c) and d), blocks are inserted between the coils and said intermediate component whereby a flow path is defined for cooling medium.

28. A method of constructing an electric machine of the type comprising a rotor having permanent magnets and a stator having coils wound on stator bars for interaction with the magnets across an air gap defined between them, wherein the bars and coils thereon are enclosed by an annular stator housing, the method comprising the steps of:
   a) providing a first mould;
   b) disposing first shoes of the stator bars in the first mould;
   c) closing the first mould and injecting molten reinforced plastics material into the first mould;
   d) opening the first mould after cooling and ejecting a first clamshell in which said first shoes are retained in the plastics moulded material of the first clamshell;
   e) providing a second mould;
   f) disposing second shoes of the stator bars in the second mould;
   g) closing the second mould and injecting molten reinforced plastics material into the second mould;

h) opening the second mould after cooling and ejecting a second clamshell in which said second shoes are retained in the plastics moulded material of the second clamshell;

i) wherein the first and second clamshells are each formed with cylindrical wall parts on inner and outer radii and a radial wall joining the inner and outer cylindrical wall parts;

j) mounting stator coils on the stator bars;

k) connecting together facing edges of said inner and outer cylindrical wall parts of the first and second clamshell housings to form said stator housing, whereby respective first and second stator shoes of each clamshell housing are mated together, securing the stator coils therebetween; and l) assembling the stator housing with the rotor.

29. A method as claimed in claim 28, wherein said first and second clamshells are identical when moulded.

30. A method as claimed in claim 28, wherein one or both of said first and second moulds include further spaces to receive at least one of the following components:

a) cylindrical boss supports, to extend along the cylindrical outer wall part when moulded;

b) connection studs, to communicate electrically the stator coils externally of the stator housing when moulded;

c) coolant inlet and outlet ports; and d) an outer race of a rotor bearing or ring for mounting thereof.

31. A method as claimed in claim 28, wherein an annular chamber is defined when said first and second clamshell housings are interconnected, which chamber is adapted to receive cooling medium for cooling said coils.

32. A method as claimed in claim 31, wherein blocks are moulded on said first and second clamshells in steps c) and g), against which blocks the coils abut when mounted in step j), whereby a flow path is defined in said chamber for cooling medium.

33. A method as claimed in claim 28, wherein said step k) of connecting facing edges of said inner and outer cylindrical wall parts is via an intermediate component.

34. A method as claimed in claim 33, wherein said intermediate component is between said inner cylindrical wall parts and comprises a mounting ring for a bearing supporting the rotor in the stator.

35. A method as claimed in claim 33, wherein said intermediate component is between said outer cylindrical wall parts and comprises a housing for the machine.

* * * * *